(12) United States Patent  (10) Patent No.: US 8,602,643 B2
Gardiner  (45) Date of Patent: Dec. 10, 2013

(54) METHOD AND APPARATUS FOR MEASUREMENT OF TEMPERATURE AND RATE OF CHANGE OF TEMPERATURE

(76) Inventor: David Phillip Gardiner, Mallorytown (CA)

( * ) Notice: Subject to any disclaimer, the term of this patent is extended or adjusted under 35 U.S.C. 154(b) by 245 days.

(21) Appl. No.: 13/176,041

(22) Filed: Jul. 5, 2011

(65) Prior Publication Data

US 2012/0008662 A1   Jan. 12, 2012

(51) Int. Cl.
G01K 3/00 (2006.01)
G01K 7/00 (2006.01)

(52) U.S. Cl.
USPC ............ 374/107; 374/179; 374/102; 374/169

(58) Field of Classification Search
USPC .................................. 374/101, 179, 107, 169
See application file for complete search history.

(56) References Cited

U.S. PATENT DOCUMENTS

| 4,475,103 A * | 10/1984 | Brokaw et al. ............... 340/501 |
| 6,942,382 B2 * | 9/2005 | Demeocq .................... 374/179 |
| 2009/0107537 A1 * | 4/2009 | Conti ........................ 136/236.1 |

* cited by examiner

*Primary Examiner* — Mirellys Jagan

(57) ABSTRACT

A method and apparatus is presented for obtaining of accurate measurements of the temperature of a thermocouple and high fidelity measurements of the rate of change of the temperature of a thermocouple. A first sub-circuit is connected to the thermocouple with two conductors made of two different thermocouple alloys which are substantially the same as the alloys used in the construction of the thermocouple. A second sub-circuit is connected to the thermocouple with two conductors made of substantially identical material, such as copper. The first sub-circuit provides an accurate measurement of the temperature of the thermocouple. The second sub-circuit provides a high fidelity measurement of the rate of change of the temperature of the thermocouple.

3 Claims, 3 Drawing Sheets

METHOD AND APPARATUS FOR MEASUREMENT OF TEMPERATURE AND RATE OF CHANGE OF TEMPERATURE

CROSS-REFERENCE TO RELATED APPLICATIONS

This application claims the benefit of Provisional Patent Application No. 61/398,922 filed Jul. 06, 2010.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to measuring temperature by the use of thermocouples. More particularly, this invention relates to thermocouple measuring devices and methods used to measure the rate of change of the temperature of the thermocouple.

Thermocouples are constructed of two dissimilar metals (typically wires) joined together at a measurement junction. As is well known, thermocouples produce a small output voltage (referred to as the "thermoelectric voltage") that is proportional to the temperature difference between the measurement junction and a reference junction. The reference junction is often referred to as the "cold junction". In modern electronic thermocouple measurement devices (thermocouple signal conditioners), the cold junction is usually formed at the location where the thermocouple wires are attached to the copper conductors of a circuit board, connector, or cable.

As is well known, a practical thermocouple measurement device commonly includes a differential input amplifier to increase the small thermoelectric voltage to usable levels, and a means of developing a signal (often referred to as the "cold compensation" signal) which varies automatically with the cold junction temperature. The amplified thermoelectric voltage and the cold compensation signal are summed to obtain a signal proportional to the temperature of the thermocouple measurement junction. These requirements have been met in a variety of ways in prior art. For example, U.S. Pat. No. 4,475,103 describes an integrated-circuit thermocouple signal conditioner that includes amplification, cold compensation, and summing functions on a single chip. U.S. Pat. No. 6,942,382 describes a miniature connector with on-board electronics providing all of the functions needed for a thermocouple signal conditioner.

As previously noted, thermocouple signal conditioners provide a signal that is proportional to the temperature of the thermocouple junction. Usually the object of the measurement is to determine the temperature of a media such as a gas, liquid, or solid that the thermocouple is in contact with. Thus, in order for the measurement to be accurate, steps must be taken to ensure that the thermocouple junction assumes the same temperature as the media of interest. This can be difficult or impossible if the temperature of the media changes rapidly.

For example, when the junction of a thermocouple is immersed in a flowing gas, and the gas undergoes rapid temperature fluctuations, the thermal inertia of the thermocouple may prevent it from changing temperature as rapidly as the gas. This well-known phenomenon is often described using terms such as thermocouple "time lag", "response time", and "time constant". In many cases involving rapid temperature changes, the thermocouple cannot respond fast enough to track the actual temperature of the media unless the measuring junction is extremely small, and therefore fragile and impractical for sustained use. Thermocouples used in industrial, aircraft, and automotive applications are normally encased in a metal protections tube (referred to as a "sheathed thermocouple") which further slows the response to temperature changes.

In some applications it is desirable to be able to measure not only temperature of the thermocouple junction, but also to measure the rate of change (derivative) of this temperature. This is achieved through the mathematical operation of differentiation, and can be accomplished using well known analog circuits known as differentiators. The derivative of the thermocouple signal can provide information about temperature fluctuations in the media that are too rapid to be tracked by the thermocouple junction temperature.

Furthermore, the temperature signal, the derivative signal, and information about the time constant of the thermocouple can be used to synthesize a signal that approximates the actual temperature of the media during rapid temperature changes. This technique (often referred to as "thermocouple time lag compensation") is well known in prior art, and was originally developed in the early 1950's by the U.S. National Advisory Committee for Aeronautics. It is disclosed in the following publication:
Shepard, C. E. and Warshawsky, L., "Electrical Techniques for Compensation of Thermal Time Lag of Thermocouples and Resistance Thermometer Elements", Technical Note 2703, NACA, Washington D.C., May 6, 1952.

Despite being known for over fifty years, the technique of thermocouple time lag compensation has not been widely used. One reason for this is the difficulty in obtaining a high fidelity derivative signal from a thermocouple. Thermocouples with adequate durability for industrial, aerospace, and automotive applications (typically relatively large, sheathed-type thermocouples) may only produce a raw (un-amplified) signal fluctuation of a few microvolts in response to high frequency temperature fluctuations. Thus, the signal is highly vulnerable to contamination by electrical noise.

By nature, differentiation amplifies any high frequency noise that is present. This noise will obscure the portion of the signal that reflects the actual derivative of the thermocouple temperature. Low-pass filtering may be used to reduce this problem, but filtering that is sufficient to remove the unwanted noise may also remove much of the intended derivative signal as well.

The cable or wiring that connects the thermocouple to the electronic circuitry of the signal conditioner is an important source of noise problems. Significant extension cable lengths are required when thermocouples are used to measure high temperatures, because the signal conditioner must be located far enough from the heat source to avoid damage to the electronic components. In order to measure the thermocouple junction temperature accurately, the two wires of the extension cable must be made of materials similar to the two alloys of the thermocouple being used. For example, if the well-known K-type thermocouple is used, the chromel lead of the thermocouple must be extended with chromel cable wire, and the alumel lead of the thermocouple must be extended with an alumel cable wire. This ensures that a cold junction is formed only at the intended location near the cold compensation circuitry.

Thermocouple cable is more prone to noise pick-up from external sources than copper cable, in part because the two conductors have unequal resistance values. The thermocouple cable will also cause noise if the conductors are subjected to strain from flexing or vibrations. This problem (often referred to as a "micro-phonic effect") is far worse with thermocouple cable than with copper conductor cable.

Thus, there is a need for an improved method and apparatus that will enable high fidelity derivative measurements to be obtained from thermocouple signals.

BRIEF SUMMARY OF THE INVENTION

The object of the invention is to provide an improved thermocouple measuring device.

It is a further object of the invention to provide a thermocouple measuring device capable of accurate measurements of the temperature of a thermocouple and high fidelity measurements of the rate of change of temperature of a thermocouple.

It is a still further object of the invention to provide a thermocouple measuring device which eliminates or substantially minimizes the disadvantages of prior art techniques with regard to the undesirable effects of signal noise on measurements of the rate of change of temperature of a thermocouple.

In accordance with one aspect of the claimed invention, the present invention comprises a thermocouple, a first sub-circuit (employing an amplifying means, a cold compensation means, and a summing means) which measures the temperature of the thermocouple according to prior art, and a second sub-circuit which measures the rate of change of the thermocouple temperature. The first sub-circuit is connected to the thermocouple with two conductors made of two different thermocouple alloys (which are substantially the same as the alloys used in the construction of the thermocouple). The second sub-circuit is connected to the thermocouple with two conductors made of substantially identical material, such as copper. The first sub-circuit provides an accurate measurement of the temperature of the thermocouple. The second sub-circuit provides a high fidelity measurement of the rate of change of the temperature of the thermocouple.

In accordance with another aspect of the claimed invention, the present invention comprises a primary thermocouple used to measure the temperature of the media in question, a secondary thermocouple used to measure the effective cold junction temperature of the primary thermocouple, a first sub-circuit (employing an amplifying means, a cold compensation means, and a summing means) which measures the temperature of the secondary thermocouple according to prior art, a second sub-circuit which measures the difference in temperature between the measuring junction of the primary thermocouple and the effective cold junction of the primary thermocouple and also measures the rate of change of the temperature of the measuring junction of the primary thermocouple. The first sub-circuit is connected to the secondary thermocouple with two conductors made of two different thermocouple alloys (which substantially match the alloys used in the construction of the secondary thermocouple). The second sub-circuit is connected to the primary thermocouple with two conductors made of substantially identical material, such as copper. The cold junction temperature measurement provided by the first sub-circuit is summed with the temperature difference measurement provided by the second sub-circuit to provide an accurate measurement of the temperature of the measuring junction of the primary thermocouple. The second sub-circuit also provides a high fidelity measurement of the rate of change of the temperature of the measuring junction of the primary thermocouple.

BRIEF DESCRIPTION OF THE DRAWINGS

A better understanding of the present invention can be obtained when the following detailed description of the invention is considered in conjunction with the following drawings, in which.

Figure 1:
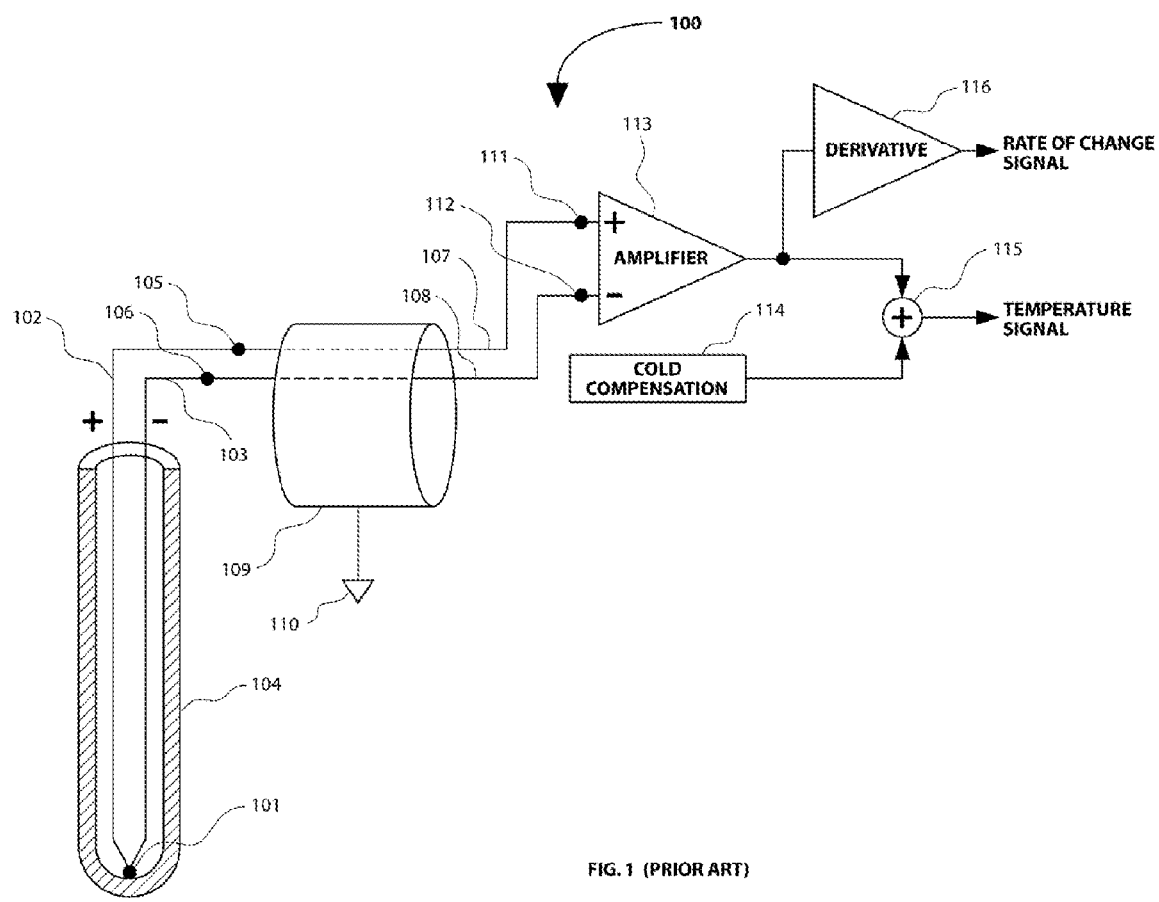
FIG. 1 illustrates a thermocouple measuring circuit according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by any appended claims.

DETAILED DESCRIPTION OF THE INVENTION

Turning now to the drawings and with particular attention to FIG. 1, a thermocouple measuring circuit according to prior art is shown. Prior art thermocouple measuring circuit 100 includes a thermocouple measuring junction 101, coupled to a positive thermocouple lead 102 and a negative thermocouple lead 103. The thermocouple measuring junction 101 and a portion of the positive thermocouple lead 102 and the negative thermocouple lead 103 are surrounded by a metal protection tube 104. The thermocouple measuring junction 101 is in contact with the protection tube 104 in this example. However, any of the thermocouple configurations that are known in prior art could be used for this measuring circuit and the following embodiments of the invention, including thermocouple configurations where the measuring junction is not in contact with the protection tube, is exposed outside of the protection tube, or where a protection tube is not used.

The positive thermocouple lead 102 is coupled to a positive thermocouple cable input node 105. The negative thermocouple lead 103 is coupled to a negative thermocouple cable input node 106. A positive thermocouple cable conductor 107 couples the positive thermocouple cable input node 105 to a positive amplifier input node 111. A negative thermocouple cable conductor 108 couples the negative thermocouple cable input node 106 to a negative amplifier input node 112. The positive thermocouple cable conductor 107 and the negative thermocouple cable conductor 108 are surrounded by a cable shield 109. The cable shield 109 is coupled to a ground 110. The positive amplifier input node 111 and the negative amplifier input node 112 are coupled to a differential amplifier means 113. The output of the differential amplifier means 113 and the output of a cold compensation means 114 are coupled to a summing means 115. The output of the differential amplifier means 113 is also coupled to a derivative means 116.

The circuit layout is arranged so that the positive amplifier input node 111 and the negative amplifier input node 112 and the cold compensation means 114 assume substantially the same temperature. The positive thermocouple cable conductor 107 is made from substantially the same material as the positive thermocouple lead 102. The negative thermocouple cable conductor 108 is made from substantially the same material as the negative thermocouple lead 106. The differential amplifier means 113 provides an output signal that is proportional to the difference in temperature between the thermocouple measuring junction 101 and the effective thermocouple cold junction formed at the amplifier input nodes 111 and 112. The cold compensation means 114 provides a signal that is proportional to the temperature of the amplifier input nodes 11 and 112. The summing means 115 provides an output signal that is the sum of the output signal of the differential amplifier 113 and the cold compensation means 114. The output signal of the summing means 115 is proportional to the temperature of the thermocouple measuring junction 101. The derivative means 116 provides an output signal that is proportional to the rate of change of temperature of the thermocouple measuring junction 101.

Examination of this prior art circuit reveals that the signal from the thermocouple must pass through cable conductors made of thermocouple material before it can be amplified and the derivative of the amplified signal can be provided. Thus, the prior art circuit has a propensity to pick up signal noise from the cable conductors, and this noise has a detrimental effect on the fidelity of measurements of the rate of change of the thermocouple temperature.

Figure 2:
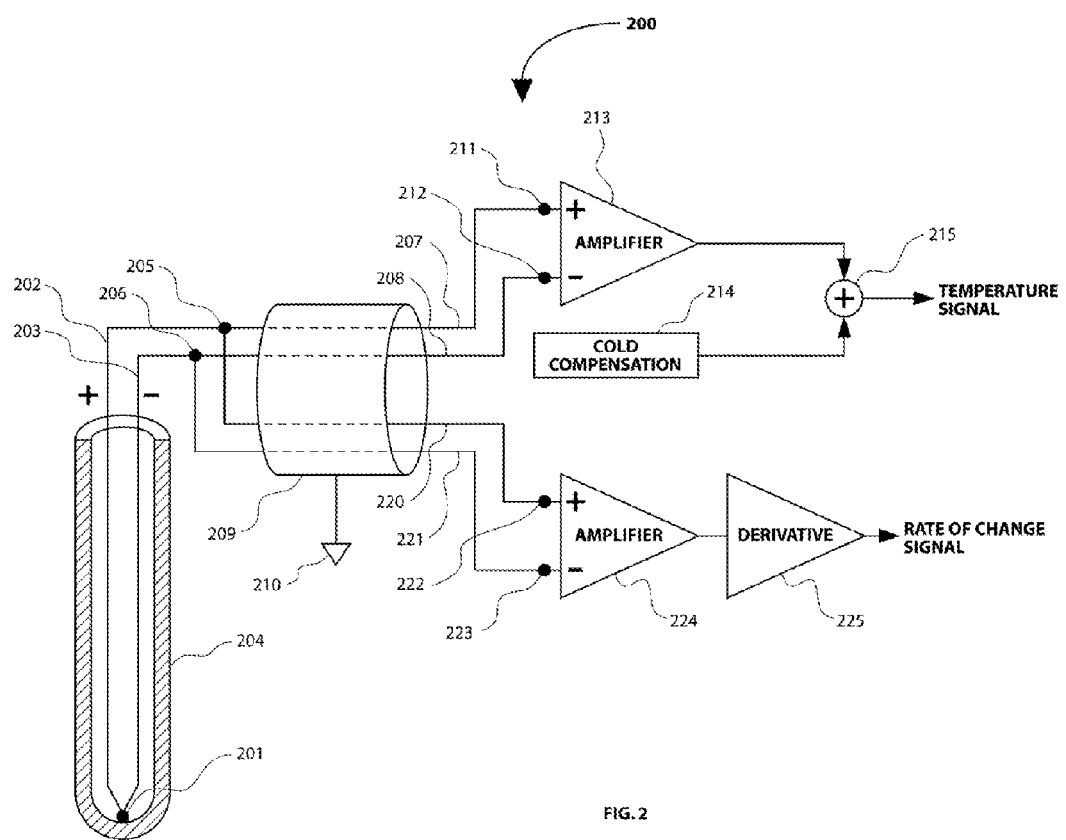
FIG. 2 illustrates a thermocouple measuring circuit according to one embodiment of the present invention.

Turning now to FIG. 2, an improved thermocouple measuring circuit 200 according to the present invention is shown. Elements 201, 202, 203, 204, 205, 206, 207, 208, 209, 210, 211, 212, 213, 214, and 215 of the thermocouple measuring circuit 200 have substantially the same arrangement and function as elements 101-115 of the prior art thermocouple measuring circuit 100 of FIG. 1. In both the improved circuit 200 and the prior art circuit 100, these elements provide a signal proportional to the temperature of the measuring junction of a thermocouple.

In the improved thermocouple measuring circuit 200 of the present invention, the rate of change of the temperature of the thermocouple measuring junction 201 is provided by means of a second signal path that avoids cable conductors 207 and 208 that are made of thermocouple material. More particularly, a second positive cable conductor 220 couples the positive cable input node 205 to a second positive amplifier input node 222. A second negative cable conductor 221 couples the negative cable input node 206 to a second negative amplifier input node 223. The second positive amplifier input node 222 and the second negative amplifier input node 223 are coupled to a second differential amplifier means 224. The output of the second differential amplifier means 224 is coupled to a derivative means 225.

The second positive cable conductor 220 and the second negative cable conductor 221 are made from substantially the same material, for example, copper. The use of cable conductors made from substantially the same material eliminates or substantially minimizes signal noise problems that would exist if cable conductors made from thermocouple material were used. The second differential amplifier means 224 amplifies the low noise signal provided through the cable conductors 220 and 221. The output of the second differential amplifier means 224 provides a low noise signal that is proportional to the difference in temperature between the thermocouple measuring junction 201 and the effective thermocouple cold junction formed by at the cable input nodes 205 and 206. The output of the derivative means 225 provides a high fidelity signal that is proportional to the rate of change of the temperature of the thermocouple measuring junction 201.

Figure 3:
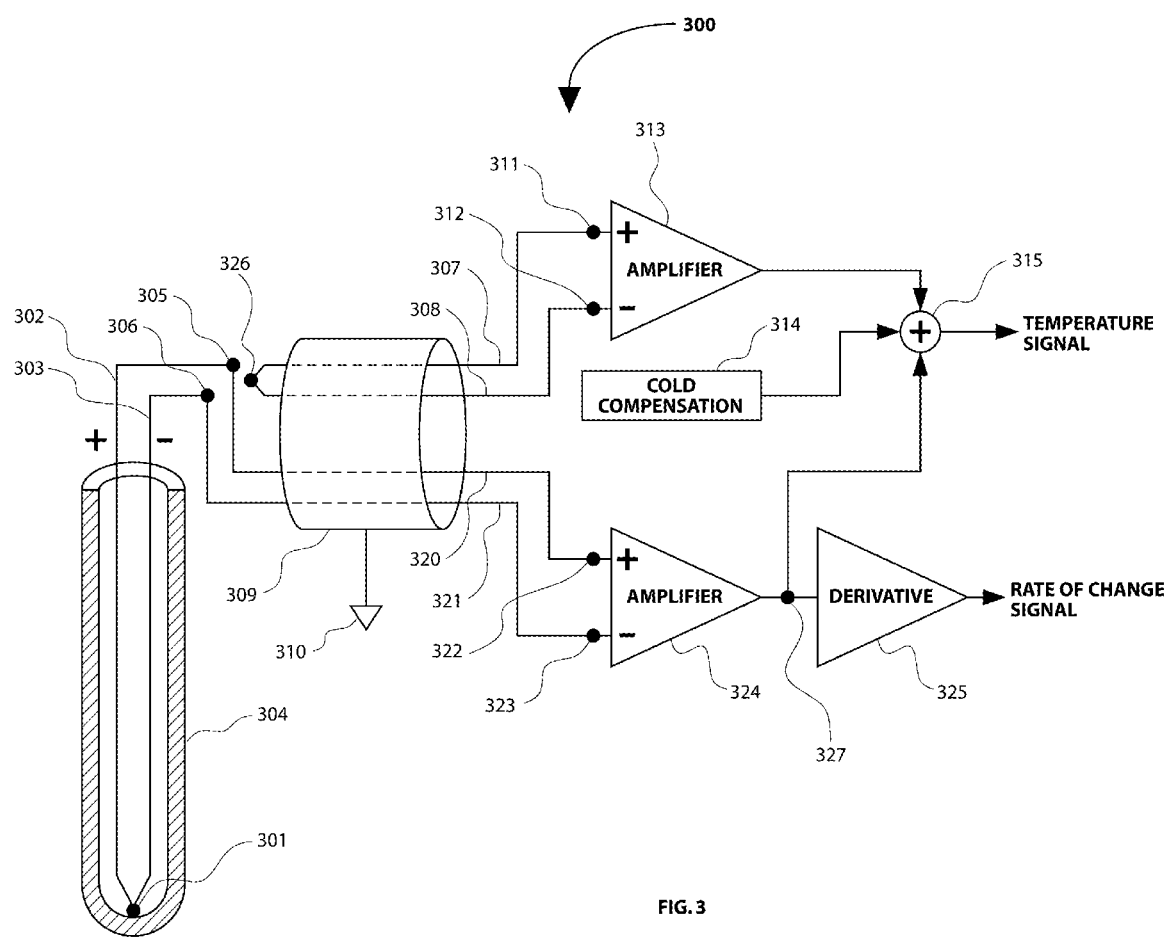
FIG. 3 illustrates a thermocouple measuring circuit according to a second embodiment of the present invention.

Turning now to FIG. 3, another improved thermocouple measuring circuit 300 according to the present invention is shown. In this embodiment of the invention, a primary thermocouple measuring junction 301 is used to measure the temperature of the media in question, and a secondary thermocouple measuring junction 326 has been added to measure the effective thermocouple cold junction temperature for the primary thermocouple measuring junction 301. The circuit is arranged so that the secondary thermocouple measuring junction 326 assumes substantially the same temperature as the effective thermocouple cold junction formed at a positive cable input node 305 and a negative cable input node 306. A positive thermocouple cable conductor 307 couples the secondary thermocouple junction 326 to a positive amplifier input node 311. A negative thermocouple cable conductor 308 couples the secondary thermocouple junction 326 to a negative amplifier input node 312. The positive amplifier input node 311 and the negative amplifier input node 312 are coupled to a differential amplifier means 313. The output of the differential amplifier means 313 and the output of a cold compensation means 314 are coupled to a summing means 315. The circuit layout is arranged so that the positive amplifier input node 311 and the negative amplifier input node 312 and the cold compensation means 314 assume substantially the same temperature.

In the improved thermocouple measuring circuit 300 of the present invention, the rate of change of the thermocouple temperature is provided by means of a signal path that avoids the use of cable conductors made of thermocouple material. More particularly, a second positive cable conductor 320 couples the positive cable input node 305 to a second positive amplifier input node 322. A second negative cable conductor 321 couples the negative cable input node 306 to a second negative amplifier input node 323. The second positive amplifier input node 322 and the second negative amplifier input node 323 are coupled to a second differential amplifier means 324. The output of the second differential amplifier means 324 is coupled to a signal node 327. The signal node 327 is coupled to a derivative means 325 and the summing means 315.

The positive thermocouple cable conductor 307 and the negative thermocouple cable conductor 308 and the second positive cable conductor 322 and the second negative cable conductor 323 are surrounded by a cable shield 309. The cable shield 309 is coupled to a ground 310.

The second positive cable conductor 320 and the second negative cable conductor 321 are made from substantially the same material, for example, copper. The use of cable conductors made from substantially the same material eliminates or substantially minimizes signal noise problems that would exist if cable conductors made from thermocouple material were used. The second differential amplifier means 324 amplifies the low noise signal provided through the cable conductors 320 and 321. The output of the second differential amplifier means 324 provides a low noise signal that is proportional to the difference in temperature between the primary thermocouple measuring junction 301 and the cable input nodes 305 and 306. The output of the derivative means 325 provides a high fidelity signal that is proportional to the rate of change of the temperature of the primary thermocouple measuring junction 301.

The differential amplifier means 313 provides an output signal that is proportional to the difference between the temperature of the secondary thermocouple measuring junction 326 and the temperature of the amplifier input nodes 311 and 312. The cold compensation means 314 provides an output signal that is proportional to the temperature of the amplifier input nodes 311 and 312. The second differential amplifier means 324 provides an output signal that is proportional to the difference between the temperature of the primary thermocouple measuring junction 301 and the cable input nodes input nodes 35 and 306. The summing means 315 provides an output signal that is the sum of the output signals of the differential amplifier means 313 and the cold compensation means 314 and the second differential amplifier means 324. Therefore, the summing means 315 provides an output signal that is proportional to the temperature of the primary thermocouple measuring junction 301.

Preferred embodiments of the improved thermocouple measuring circuit 200 shown in FIG. 2 and the improved thermocouple measuring circuit 300 shown in FIG. 3 use the following parts and components:

(a) The preferred differential amplifier means for 213 and 224 (FIGS. 2), and 313 and 324 (FIG. 3) is an instrumentation amplifier, such as an AD620 integrated circuit instrumentation amplifier. Many suitable integrated circuit instrumentation amplifiers are available. Other means of amplifying the thermocouple signal could also be used.

(b) The preferred cold compensation means for 214 (FIGS. 2) and 314 (FIG. 3) is an integrated circuit temperature sensor, such as the LM35 integrated circuit temperature sensor. Many suitable temperature sensors are available. Other means of providing a cold compensation signal could also be used.

(c) The preferred derivative means for 225 (FIGS. 2) and 325 (FIG. 3) is a well known operational amplifier circuit commonly known as a practical differentiator or a compensated differentiator. The TLE2062 operational amplifier has been used. Many suitable operational amplifiers are available. Other means of providing an output signal proportional to the derivative of the input signal could also be used, including means involving digital signal processing and frequency domain signal analysis.

(d) The preferred summing means for 215 (FIGS. 2) and 315 (FIG. 3) is a well known operational amplifier circuit commonly known as summing amplifier. The TLE2062 operational amplifier has been used. Many suitable operational amplifiers are available. Other means of providing an output signal proportional to the sum of the input signals could also be used, including means involving digital signal processing.

The practical differentiator and the summing amplifier are described in many publications, including the following:

Paul Horowitz and Winfield Hill, "The Art of Electronics", Cambridge University Press 1980, 1989, ISBN 521 37095 7.

The preferred construction for the cable assembly (comprised of 207, 208, 209, 220, and 221 in FIGS. 2 and 307, 308, 309, 320, and 321 in FIG. 3) is as a single cable, with the thermocouple conductors arranged as one twisted pair, the non-thermocouple conductors arranged as a second twisted pair, and with both twisted pairs surrounded by a single grounded shield. Other cable configurations could be used, including, but not limited to, separate cables for the thermocouple conductor pair and the non-thermocouple conductor pair, separate shields for the thermocouple conductor pair and the non-thermocouple conductor pair, the use of un-twisted conductor pairs, the use of un-shielded conductor pairs or cable assemblies, and the use of un-grounded shields.

Numerous variations and modifications will become apparent to those skilled in the art once the above disclosure is fully appreciated. It is intended that the claims to be submitted in the regular application will be interpreted to embrace all such variations and modifications.

What is claimed is the following:

1. An apparatus for measuring the temperature and rate of change of temperature of a thermocouple comprising:
    a thermocouple;
    a first circuit coupled to said thermocouple by means of two conductors made of different materials, said materials being substantially the same alloys as those used in the construction of said thermocouple, wherein said first circuit measures the temperature of the measuring junction of said thermocouple;
    a second circuit coupled to said thermocouple by means of two conductors made of substantially identical materials, wherein said second circuit measures the rate of change of the temperature of the measuring junction of said thermocouple.

2. An apparatus for measuring the temperature and rate of change of temperature of a thermocouple comprising:
    a first thermocouple;
    a second thermocouple arranged to measure the cold junction temperature of said first thermocouple;
    a first circuit coupled to said second thermocouple by means of two conductors made of different materials, said materials being substantially the same alloys as those used in the construction of said second thermocouple, wherein said first circuit measures the temperature of the measuring junction of said second thermocouple;
    a second circuit coupled to said first thermocouple by means of two conductors made of substantially identical materials, wherein said second circuit measures the rate of change of the temperature of the measuring junction of said first thermocouple.

3. A signal cable for coupling a thermocouple to a measurement circuit comprising:
    a first pair of conductors made of different materials, said materials being substantially the same as the alloys used in the construction of said thermocouple, wherein said first pair of conductors couples said thermocouple to a means of measuring the temperature of the measuring junction of said thermocouple;
    a second pair of conductors made of substantially identical materials, wherein said second pair of conductors couples said thermocouple to a means of measuring the rate of change of the temperature of the measuring junction of said thermocouple.

* * * * *